Figure 1:
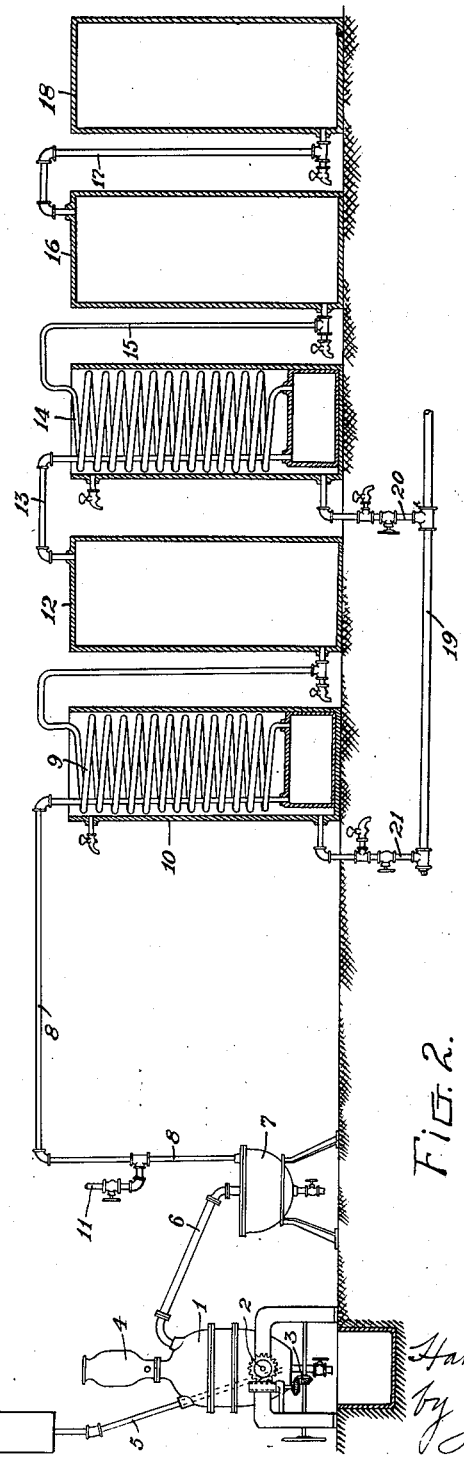

H. D. RANKIN.
METHOD OF TREATING METALLIFEROUS MATERIALS AND RECOVERING SOLVENTS USED.
APPLICATION FILED JULY 17, 1909.

1,150,787.

Patented Aug. 17, 1915.

UNITED STATES PATENT OFFICE.

HARRY D. RANKIN, OF CRAFTON, PENNSYLVANIA, ASSIGNOR, BY MESNE ASSIGNMENTS, TO RANKIN PROCESS COMPANY, OF PHOENIX, ARIZONA, A CORPORATION OF ARIZONA.

METHOD OF TREATING METALLIFEROUS MATERIALS AND RECOVERING SOLVENTS USED.

1,150,787. Specification of Letters Patent. Patented Aug. 17, 1915.

Application filed July 17, 1909. Serial No. 508,108.

*To all whom it may concern:*

Be it known that I, HARRY D. RANKIN, a citizen of the United States, residing at Crafton, in the county of Allegheny and State of Pennsylvania, have discovered or invented a new and useful Improvement in Methods of Treating Metalliferous Materials and Recovering Solvents Used, of which improvement the following is a specification.

My invention relates to improvements in methods or processes for treating metalliferous materials for the purpose of recovering the metal values contained therein and for recovering the acid solvent used.

The objects of my invention are to produce a method or process for treating ores, minerals, concentrates, slimes, waste materials, mattes, etc., for the recovery of the metal values contained therein, which is comparatively inexpensive, and of almost universal application, and also relates to the recovery or reclamation of the acid solvent used, by the utilization of certain negative or acid-forming elements, particularly sulfur, which usually interferes with and causes unavoidable trouble in treating ores, etc.

I accomplish these objects by means of the method or process hereinafter described, which, broadly stated, consists in treating ores or other metalliferous substance, when reduced to proper degree of fineness with nitric acid ($HNO_3$) in the presence of suitable negative, *i. e.* acid-forming elements, capable of being oxidized by the nitric acid to its or their respective acid, the acid also oxidizing the metal values contained in the substance under treatment and converting the same into a sulfate solution, the NO of the nitric acid evolved during the operation, being re-oxidized and recovered as nitric acid ($HNO_3$), the said action and reaction being indicated in the following equation:

(1) $3CuS + 8HNO_3 = CuSO_4 + 8NO + 4H_2O$
(2) $8NO + 4H_2O + 12O = 8HNO_3$

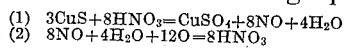

The second reaction set forth in the second equation takes place in several stages, but is quantitatively complete. The reaction set forth in equation (1) is never quantitatively complete and is supplemented by the following equation:

(3) $3CuS + 3HNO_3 = 3Cu(NO_3) + 2NO + H_2O + 3S$.

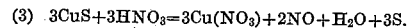

Under the right conditions of temperature, pressure, and mass arrangement, however, only 2 to 4 per cent. of sulfid will be changed into nitrate, according to equation (3), while the bulk of the sulfid will be changed into sulfate according to equation (1).

In the event the ore contains, instead of sulfids, combinations of other negatives, *i. e.*, acid-forming elements, such as, for instance, arsenic antimony, tellurium, etc., a reaction similar to equation (1) takes place, producing the respective acid and sometimes salts, *e. g.*, arsenates, etc., generally soluble in a sulfate solution.

The practical value of the process lies not only in its universality of application, but also in the fact that all the sulfids are converted into sulfates which latter are generally soluble in water and from which the metal values may be easily recovered.

In practising my invention ore or other metalliferous material is pulverized or otherwise converted into the required condition of fineness. It is then treated preferably as follows: with a quantity of nitric acid or an equivalent, as, for instance, nitrate of soda, $NaNO_3 + H_2SO$, sufficient to oxidize the oxids, bases and carbonates, as well as sulfids, tellurides, arsenides, etc., in the presence of the acid forming element or elements, compound or compounds, which are generally present in the ores, as, for instance ($FeS_2$, or other compound, as $H_2S$, $SO_2$, $H_2SO_4$, MaCl) and dissolve all the soluble material contained therein to sulfate when sufficient sulfur is in the ore, and if not to convert the oxids, bases and carbonates to dioxids, sulfids, arsenides, etc., and finally to sulfates with $HNO_3$. Or if it is more economical I may convert the oxids, bases and carbonates to sulfate, chlorid or bicarbonates by treating the same with $H_2SO_4$, or with HCl, or with water and carbonic acid, and thereafter with nitric acid, $HNO_3$. Ordinary operation will not involve the use of $H_2SO_4$, HCl or $CO_2$ for the reason that there is generally enough acid forming element contained in the ore to put all the soluble matter in the form of sulfates, arsenates, tellurates, etc., when treated with $HNO_3$. The solution obtained generally contains chiefly the sulfate salts of the respective metals, excepting gold and metals of the platinum group, if these are present in the ore. The solution is then decanted. In feeding the ore or treating the same with the acid the ore is preferably fed into the acid in finely divided streams for the purpose of obtaining a maximum displacement of NO and a rapid dissolving of the soluble material contained in the ores. The gold and metals of the platinum group which remain in the residue are recoverable in any suitable manner.

In treating sulfur bearing ores with nitric acid I use the nitric acid as an oxidizing agent and the sulfur or other negative acid forming substance with the nitric acid in furnishing the evolution of the NO to be re-oxidized, etc., to $HNO_3$ and saved and produce the suitable acid, i. e., sulfuric acid, which dissolves the soluble materials contained in the ore to sulfates and not nitrates, and for this purpose, i. e., to produce sulfates and not nitrates of the soluble material it is necessary that the suitable physical and chemical conditions of the re-agents employed should be observed, that is to say, the process should be carried out in a closed vessel or retort in the presence of air, preferably compressed, so as to hasten the re-action and at the same time hold down the temperature to a point which will prevent the segregation of the sulfur as incrusted or wadded sulfur which would result if the temperature was too high. The maintenance of the requisite temperature, i. e., approximately below the melting point of sulfur, insures the production of sulfates and not nitrates. The dilution of the acid prevents too great heat being evolved during the oxidation but the action would be comparatively slow if it were not that it is hastened by the fact that the treatment is carried on under pressure in the re-action which takes place, i. e., the oxidation of the sulfur or other negative acid forming element by the nitric acid, sulfuric acid is produced which converts the soluble materials contained in the ore to solvents and not nitrates and the NO which is evolved in the re-action is oxidized to $NO_2$ and finally recovered as nitric acid. When treating some classes of finely divided ores, calcium carbonate may be used at a temperature and pressure requisite to form soluble bicarbonates $CO_2$ evolved being recovered.

In treating the ore or metalliferous substances with carbonic, hydrochloric, sulfuric acid, or with nitric acid (or suitable equivalent, as aforesaid) in the presence of a suitable negative element, i. e., acid forming element, e. g., sulfur or a sulfur compound, e. g., sulfuric acid, in some instances it may be desirable to treat the finely divided material with two-thirds to three-fourths of the acid, or its equivalent, theoretically sufficient to dissolve all the material or to oxidize all the negative element, i. e., acid forming element or elements and metals and then treat the residue with the remaining acid. In each case, all, or substantially all of the metal values are dissolved out of the ore, etc., under treatment, and the used excess $CO_2$ recovered, the NO displaced in the case of the nitric acid, or its suitable equivalent, with the negative element, i. e., acid forming element or elements present, is re-oxidized and absorbed in any suitable manner to form $HNO_3$ for future use. The NO evolved may be re-oxidized by air, or any oxidizing agent, and absorbed in the solution to $HNO_3$ for future use, upon fresh material being added to the solution; or the NO may, preferably, be conveyed from the retort or digester into a separate vessel, re-oxidized therein and absorbed in a suitable manner, e. g., with air and water, to $HNO_3$ for future use, or it may be oxidized in the digester to $NO_2$, conveyed therefrom to suitable vessels containing suitable absorbents, in which it may be further oxidized and converted into $HNO_3$. It is preferable in carrying out or practising my invention that the metalliferous materials are fed or charged into the solvent solutions continuously, and at all events, at a speed commensurate with the absorption of the nitrous oxids in the absorbing vessels; to this purpose it is desirable that the outtakes or conduits from the digester or retort to the cooler and condenser, and from thence to the absorbing vessels, be of large diameter. It may even be necessary to accelerate the draft or passage of the NO, $NO_2$, etc., through the digester, cooler, condenser and system of pipes, and the absorbing vessels by a pump or exhauster, or by any means that will accelerate the draft of said fumes. It is at times preferable in the practice of my invention that suitable conducting agents, i. e., catalytic and ionizing agents are present and are, with the other re-agents, employed under suitable conditions, such as of homogeneity, molecular-concentration, heat, pressure, motion, mechanical arrangement, light, electricity, etc., as when these factors are employed the desired solution and residue and the reclamation of the $HNO_3$ obtained. These conditions vary with the chemical and physical characteristics of the material to be treated so that the concentration of the nitric acid might vary approximately between 1.10 and 1.35 specific gravity, the pressure vary approximately between eight pounds and fifty pounds to the square inch, the temperature being maintained below the melting point of sulfur at the particular pressure used. At atmospheric pressure the melting point of sulfur is about 114° C., although this increases as the pressure rises so that it is impossible to make any definite statement as to the exact temperature, although under the more usual conditions the temperature would always be below 125° C. With unusual compositions of matter the above mentioned limits of concentration, pressure and temperature might be extended.

In the event that materials are treated with nitric acid, or with a suitable equivalent, e. g. $NaNO_3+H_2SO_4$, alone, i. e., where the acid forming elements or compounds are not originally in the ore or metalliferous substance or are omitted wholly or in part, the solution obtained is then either wholly or partly a nitrate solution which, upon being evaporated, nitrate salts are produced, the NO of the nitrate salts may be displaced and recovered by heating the salts, and then re-oxdizing and absorbing the NO and $NO_2$ as heretofore herein specified.

If the solution contains arsenic, it can be separated with ammonia instead of $CaCO_3$, if no separation of other metals as bicarbonates is desired, provided there is an excess of iron in said solution, i. e., an excess of iron as compared with arsenic, similarly as in the case of precipitation by $CaCO_3$, approximately in pound volumes of four (4) or more to one (1), when the arsenic and iron will be precipiated from the said solution as an arsenate of iron.

In the above described method, ores or mineral bearing substances may be roughly though not completely classified, for the purpose of illustration, into the following ten principal classes, wherein the soluble matter (excepting gold and silica) consists of:

(1) Oxids, bases, carbonates of metals to be saved and having enough negative or acid forming element, e. g. sulfur, present to form sulfates of the said metals with nitric acid, whence no $CO_2$, HCl nor $H_2SO_4$ need be used as no nitric acid is lost, because there being sufficient negative element, i. e., sulfur, all the NO is displaced, re-oxidized and absorbed to form $HNO_3$, e. g.,

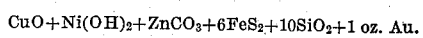

No trouble is encountered in treating such ore, etc.

(2) Oxids, bases, carbonates of metals undesirable to save, though in the ore there is sufficient acid forming element, e. g., sulfur, present to form sulfates of said metals with nitric acid, whence no $CO_2$, HCl, nor $H_2SO_4$ need be used as no nitric acid is lost, because all the NO thereof is displaced, re-oxidized and absorbed to form $HNO_3$, e. g.,

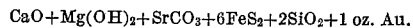

(3) Metallics with acid forming elements and compounds, not oxids, bases or carbonates, having enough negative or acid forming elements, e. g., sulfur, or arsenic or tellurium, to form sulfates, arsenates, tellurates, etc., of the metals with nitric acid, whence no nitric acid is lost because all the NO is displaced, re-oxidized and absorbed to form $HNO_3$, e. g.,

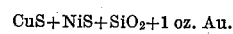

(4) The same as class 1, except that there is an excess of negative or acid forming material, but the treatment and result are the same, as all the NO is evolved and no nitric acid is lost, etc., e. g.,

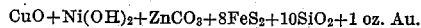

(5) The same as class 2, except that there is an excess of negative or acid forming material, but the treatment and result are the same, as all NO is evolved and no nitric acid is lost, e. g.,

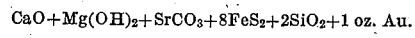

(6) The same as class 3, except that there is an excess of negative or acid forming material, but the treatment and result are the same, as all NO is evolved and no nitric acid is lost.

(7) Now comes the class where there is not sufficient negative or acid forming material, e. g., sulfur, in the ore to form sulfates of all the soluble matter in the ore and if $CO_2$, HCl, or $H_2SO_4$ were not used, nitrates would be formed of what the ore lacked in negative or acid forming material, e. g., sulfur, and the nitric acid would be lost unless the NO were displaced from said nitrates by heat or otherwise. In order to avoid this (though there may be cases where the formation of the nitrates would be small and then it would be more economical to simply use nitric acid although some of the nitrates were formed or the nitric acid lost) where economical either carbonic acid, under suitable temperature and pressure, $H_2SO_4$ or HCl (depending upon which is the more economical at the desired place of treatment), may be used upon the ore in a closed vessel to dissolve out the oxids, bases and carbonates contained in the ore, etc., to sulfates, chlorids or soluble bicarbonates and decanted off from the residue, if any, which may then be treated with nitric acid for any desired metal remaining in the shape of a sulfid, telluride, arsenide, etc., insoluble in the carbonic acid, HCl, or $H_2SO_4$. The solutions in both cases being treated as specified. There are of this order, three kinds, the same as classes 1 and 4, except as they lack sufficient negative or acid forming material to form sulfate of all the soluble matter, e. g., $$CuO+Ni(OH)_2+ZnCO_3+2FeS_2+10SiO_2+1 \text{ oz. Au.}$$

Here nitrates of copper, nickel, zinc, ferric sulfate, and the residue of $SiO_2$ and Au would result in treatment with $HNO_3$ hot and strong, and some of the $HNO_3$ would be lost, i.e., not recovered by displacing NO, unless heated to displace the NO to be displaced, re-oxidized, absorbed, etc., hence it is better to use carbonic acid and bicarbonate the copper, nickel and zinc specified, separating the bicarbonate solutions from the residue and re-precipitating by displacing the $CO_2$ for re-use leaving only normal carbonates, one after the other, or use $H_2SO_4$, or HCl if more economical to remove the oxids, etc., then decant and add $HNO_3$ to the residue; or at first supply the lack of sulfur in the ore by adding $H_2SO_4$ directly to the nitric acid without first removing the oxids, etc., from the original ore, whereby sulfates, etc., are formed, all NO evolved and hence no nitric acid is lost, and the residue of SiO+1 oz. Au remains suitable for amalgamation or other treatment.

(8) Same as classes 2 and 5, except that it lacks sufficient negative or acid forming material, e. g., sulfur, to form sulfates of all the soluble matter, e. g., $$CaO+Mg(OH)_2+SrCO_3+2FeS_2+2SiO_2+Au.$$

The treatments and results are the same for this as for class 7, only calcium, magnesium, etc., are not worth saving and may be simply removed from the ore by $CO_2$ or $H_2SO_4$ or HCl, and re-precipitated aside to prevent the loss of nitric acid later used in the treatment of the acidic material, i. e. sulfid of iron.

(9) The same as classes 3 and 6, except that it lacks sufficient negative or acid forming material, e. g.

$$CuS_2+Ni2S+SiO_2+1 \text{ oz. Au.}$$

The treatment and results in this case are the same as for class 7.

(10) This class arises where there is a mixture of classes, 1, 2, 3, 4, 5 and 6 with classes 7, 8 and 9, but in all these various classes, the question of the use or non-use of carbonic acid, HCl, or of $H_2SO_4$, or suitable sulfur compound, or all of them as against the use of nitric acid alone, is all a question of technical economy.

The enumerated classes may be regarded as the basic or principal ones in dealing with the use of $CO_2$ and the evolution of the NO, yet there are special classes in which special treatment is required, because some as may be apparent to persons skilled in the art, may be required to be treated with the nitric acid, or suitable equivalent, e. g., $NaNO_3+H_2SO_4$ alone once, observing the conditions herein above specified, and others with nitric acid, or suitable equivalent as herein above specified, then decanting and filtering and the residue again leached with nitric acid or suitable equivalent, in the presence of a suitable negative, i. e., acid forming elements or compounds, decanting and filtering, and the residue again leached with a mixture of nitric acid or a suitable equivalent and sulfur containing material; others with nitric acid, or a suitable equivalent, and a suitable chlorin compound, e. g., NaCl, or HCl, as often as necessary, with the conditions all as herein above specified; others with nitric acid or a suitable equivalent and a suitable acid forming (i. e., sulfur bearing) substance until $H_2SO_4$ forms, then with a suitable chlorin compound, e. g., NaCl, or HCl, as often as necessary, with the conditions all as herien above specified; others first with nitric acid or a suitable equivalent, decanting or filtering, and then the residue first with a suitable acid forming (e. g., sulfur bearing) substance, until $H_2SO_4$ forms, then with a suitable chlorin compound, e. g., NaCl, or HCl, with all the conditions as herein above specified; others first with nitric acid or a suitable equivalent, decanting or filtering, and the residue with nitric acid or a suitable equivalent, a suitable (e. g., sulfur bearing) substance until $H_2SO_4$ forms, then with a suitable fluorin compound, e. g., $CaFl_2$, with the conditions all as herein above specified; others first with nitric acid, or a suitable equivalent, decanting or filtering and then the residue with nitric acid, or a suitable equivalent, a suitable acid forming (e. g., sulfur bearing) substance and a suitable chlorin compound (e. g., NaCl), or HCl, decanting or filtering and then the residue with nitric acid, or a suitable equivalent, a suitable acid forming (e. g. fluorin bearing substance e. g. $CaFl_2$), with the conditions all as herein above specified; others first with nitric acid or a suitable equivalent, and a suitable acid forming (e. g., sulfur bearing) substance, then decanting or filtering and then the residue with nitric acid or a suitable equivalent, a suitable acid forming (e. g., sulfur bearing) substance, then decanting or filtering and then the residue with nitric acid, or a suitable equivalent, and a suitable acid forming (e. g., sulfur bearing) substance, until $H_2SO_4$ forms and then with the addition of a suitable fluorin compound (e. g. $CaFl_2$), as often as necessary, with the conditions all as herein above specified.

In all the cases it is intended that, taking into consideration the compositions and specific properties of the ore, etc., there will be present such catalytic and ionizing agents, and such physical conditions, as of heat, etc., as herein above specified, that the $CO_2$ will act as a solvent in and as a precipitating agent by displacement and the nitric acid, or suitable equivalent, will not only act as an oxidizing agent of the material treated, but will in the presence of a suitable acid forming substance, furnish the evolution of the NO to be re-oxidized, etc., to $HNO_3$ and saved, and thus to produce the suitable acid, e. g., sulfuric, which acid will in turn not only form sulfates and thus prevent loss of $HNO_3$, but will when needed (e. g., in ores containing platinum) form the necessary hydrochloric acid or chlorin with the nitric acid and a chlorin compound, or where needed (e. g., ores containing values, as insoluble silicates) form the necessary fluorin or hydrofluoric acid with the nitric acid and a fluorin compound.

When it is desirable I may roast out the excess sulfur, As, etc., to obtain $H_2S$, $H_3As$, $SO_2$, $As_2O_3$, etc., for use as before stated; again I may use on the ore concentrates, residues, etc., (before the main leachings as described above) or upon any valuable slimes, (a) the decanted or filtered solutions from the former main leachings or (b) any of the regenerated solutions resulting from electrolysis or chemical precipitations of values, or (c) first one and then the other of said solutions, thereby often dissolving or precipitating metals, oxids, bases, salts, etc., neutral acid or basic, hydrogen sulfid, sulfuric, hydrochloric or hydrofluoric acids, and thus decrease the amount of nitric acid, otherwise necessary to bring useless stuff into solution, often greatly to be desired before the main leachings. In other cases it is more desirable not to use carbonic acid first on ore to remove all the soluble matter in it, but to recover the re-agents or substances, in any of the said ores or solutions by well known methods, which I then use. By this method of using carbonic acid on said decanted or filtered or regenerated solutions and then using and saving the $HNO_3$ when used alone or combined with negative elements, e. g., as sulfur, HCl and NaCl, or fluorspar, or any combination or permutations of them, as well as neutralizing agents when necessary, practically all metalliferous substances containing metal values can be treated very cheaply, the main cost being for power, and for pumping air and $CO_2$.

In carrying out or practising my invention, I use an apparatus having a suitable opening for the admission of $CO_2$ or air, hot or cold as necessary, and the introduction of the ore to be treated; means and openings or passages, enabling the discharge of the solution and of the residue into a settling, washing, filtering and precipitating tank, which for convenience may be located immediately beneath the retort or discharge, conduits or pipes connecting the upper end of the digester with a receiver for the purpose of conveying the NO and $NO_2$ evolved in the operation from the digester into said vessel; proper conduits leading from the receiver to the cooling devices, one of which is arranged between the receiver and the first absorbing tower or tank, and another between the first and second towers; other cooling coils and devices may be employed at such points as may be necessary to lower the temperature of the gases, caused by oxidizations and re-oxidizations in the cooling and mixing devices, as well as in the towers where the gases are absorbed to form $HNO_3$.

Figure 2:
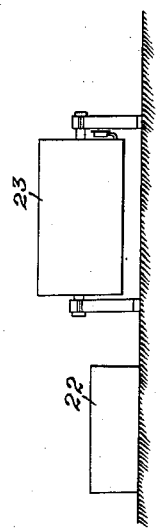

In the accompanying drawings Figure 1 indicates a diagrammatic view of an apparatus applicable to carrying out my improved method. Fig. 2 is a side elevation of the solution tank and rotating bicarbonating tank.

Referring to said drawings, 1 is a digester or retort, which may be of any suitable configuration and is capable of being turned on trunnions 2, which are capable of being actuated through the gear mechanism 3. The said retort is also provided with a charging device 4, secured in the top thereof, the said device being capable of charging a measured amount or quantity of finely divided ore or other metalliferous material into the acid solvent that may be contained in the retort. The opening is formed in the top of the retort through which an air or $CO_2$ pipe, 5, for the admission of air or $CO_2$ passes to the interior of the retort for the purpose of agitating the contents and in a measure producing oxidization and solution within the retort.

6 is a pipe connecting, respectively, with the top of the retort and the upper side of the receiver 7.

8 is a conduit leading from the receiver to a trap beneath the first cooling coil 9, which may be located in the vessel 10, of any suitable construction. A pipe 11 enters the said pipe 8, for the purpose of introducing air thereto, and is provided with a valve to regulate and control the admission thereof. An extension of the pipe 8 connects the cooling coil 9, said cooling device 9 with a short pipe that enters the bottom of the lower side of the first absorbing tower 12. The pipe 13 leads from the top of the tower to the cooler 14, which is located in a vessel similar to the first. A cooler pipe 15 leads from the said cooler to the second absorbing tower 16. A pipe 17 leads from the said absorbing tower to the next absorbing tower 18. The water supply pipe 19 is connected with branch pipes 20 and 21, respectively, leading from the two coolers in which the vessels are located.

22 is a solution tank.

23 is a rotary separating, i. e., bicarbonating tank.

I have discovered that the nitrous oxids are more rapidly and completely absorbed if suitable pressure is maintained in the absorption towers. The pressure preferably ranges between fifteen and sixty pounds per square inch. I have also discovered that, although not theoretically necessary to have an excess of negative or acid forming element or compound present when using the nitric acid, it is better to have from one (1) to ten (10) per cent. in excess, as in this case the last traces of NO and $HNO_3$ are easily displaced or drawn from the solution, in case of any separation of free sulfur remaining unoxidized.

Having described my invention or discovery, what I claim and desire to secure by Letters Patent is:

1. The method of treating metalliferous material containing acid forming substances for the purpose of recovering the values contained therein, which consists in treating the same in a closed vessel with nitric acid while subjected to pressure and maintaining it at a temperature below 125° C.

2. The herein described method of treating ores and metalliferous bodies, which consists in treating finely divided metalliferous substances with carbonic acid gas at suitable temperature and pressure, to form soluble bicarbonates, and removing the same from the residue, and then treating the residue with nitric acid, and recovering the NO evolved to form $HNO_3$.

3. The herein described method of treating metalliferous bodies, which consists in treating finely divided metalliferous substances with carbonic acid gas at suitable temperature and pressure, to form soluble bicarbonates, and removing the same from the residue, and then treating the residue with nitric acid in the presence of a suitable acid forming material in amount sufficient to cause the displacement of the NO, and recovering the same to form $HNO_3$.

4. The method of treating sulfur bearing metalliferous materials for the purpose of recovering the values contained therein, which consists in treating the same with nitric acid in a closed vessel while subjected to pressure and maintaining it at a temperature below that of the melting point of sulfur.

5. The method of treating sulfur bearing metalliferous materials for the purpose of recovering the values contained therein and the solvent used, which consists in treating the same in a closed vessel with nitric acid of a suitable concentration and under suitable pressure, maintaining the same at a temperature below the melting point of sulfur, reconverting the NO to nitric acid, and utilizing such nitric acid in the treatment of additional quantities of ore.

6. The method of treating sulfur bearing ores to recover the values contained therein, which consists in treating the finely divided ore with carbonic acid gas at a suitable temperature and pressure to form soluble bicarbonates, removing the same from the residue, and treating the residue with nitric acid while subjected to pressure and maintained at a temperature below the melting point of sulfur.

7. The method of treating metalliferous materials for the purpose of recovering the values contained therein which consists in charging the ore into a closed vessel, treating it with nitric acid while subjected to pressure in the presence of a suitable acid forming material sufficient in amount to displace the NO of the $HNO_3$ used and capable of being oxidized by said nitric acid to its respective acid, recovering the NO evolved, and maintaining a temperature within the vessel during the operation requisite to insure the production of a solution of the salt of the respective acid instead of a nitrate solution.

8. The method of treating metalliferous materials for the purpose of recovering the values contained therein, which consists in charging the metalliferous material in relatively small quantities into nitric acid contained in a closed vessel and subjected to pressure, and maintaining it at a temperature below 125° C.

9. The method of treating metalliferous materials containing acid forming substances for the purpose of recovering the values contained therein, which consists in charging the metalliferous material into nitric acid contained in a closed vessel and subjected to pressure, agitating the same and maintaining it at a temperature below 125° C.

In testimony whereof, I have hereunto signed my name in the presence of two subscribing witnesses.

HARRY D. RANKIN.

In the presence of—
CLARENCE A. WILLIAMS,
JOHN H. RONEY.